United States Patent
Betouin et al.

(10) Patent No.: US 8,045,708 B2
(45) Date of Patent: Oct. 25, 2011

(54) DISCRETE KEY GENERATION METHOD AND APPARATUS

(75) Inventors: Pierre Betouin, Paris (FR); Mathieu Ciet, Paris (FR); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 730 days.

(21) Appl. No.: 12/124,905

(22) Filed: May 21, 2008

(65) Prior Publication Data

US 2009/0319769 A1     Dec. 24, 2009

(51) Int. Cl.
*H04L 9/00* (2006.01)
(52) U.S. Cl. .................................. 380/44; 380/277
(58) Field of Classification Search .................. 713/150; 380/28–30, 283, 286, 44–47, 277–279
See application file for complete search history.

(56) References Cited

U.S. PATENT DOCUMENTS

| | | | |
|---|---|---|---|
| 4,665,523 A * | 5/1987 | Citron et al. .................. 714/785 |
| 5,214,696 A * | 5/1993 | Keiser et al. .................. 380/277 |
| 7,394,902 B2 * | 7/2008 | Yamamichi et al. .......... 380/277 |
| 2005/0157878 A1 * | 7/2005 | Matsushita .................... 380/239 |
| 2007/0230692 A1 * | 10/2007 | Akiyama et al. ................ 380/44 |
| 2007/0274518 A1 * | 11/2007 | Futa et al. ....................... 380/30 |
| 2008/0037778 A1 * | 2/2008 | Matsushita ..................... 380/44 |
| 2009/0034714 A9 * | 2/2009 | Boneh et al. ................... 380/28 |
| 2010/0020964 A1 * | 1/2010 | Horie .............................. 380/44 |

* cited by examiner

*Primary Examiner* — Gilberto Barron, Jr.
*Assistant Examiner* — Abdulhakim Nobahar
(74) *Attorney, Agent, or Firm* — Morrison & Foerster LLP

(57) ABSTRACT

A computer enabled secure method and apparatus for generating a cryptographic key, to be used in a subsequent cryptographic process, where the key is to be valid only for example during a specified time period. The method uses a polynomial function which is a function of an input variable such as time, and dynamically computes the key from the polynomial. This is useful for generating decryption keys used for distribution of encrypted content, where the decryption is to be allowed only during a specified time period.

15 Claims, 1 Drawing Sheet

DISCRETE KEY GENERATION METHOD AND APPARATUS

FIELD OF THE INVENTION

This disclosure relates to data security and cryptography and key generation.

BACKGROUND

In the field of computer software and data security (which are typically cryptography related), it is often necessary to condition cryptographic key access to the result of an evaluation function. Known methods to solve this problem are based on secure conditional tests, often using hash functions.

For open computing platforms (such as personal computers) the problem is more difficult. In this case, a known solution is called branch protection. The idea is to modify the program execution flow to complicate it such that it is hard for an attacker to understand when a test is conducted, how many tests are applied, what kind of tests are done, where the tests are processed, and what is the right configuration to force the acceptation of the test. These techniques of modifying the execution flow of a program and thereby protecting the tests are part of the field of code obfuscation and code enforcement, but have the drawback of requiring many patches (at different locations) to redirect/modify the execution path.

SUMMARY

The above relates to conditional access, but another practical need identified by the present inventors is to limit access to a cryptographic key in terms of a variable such as time; the goal is that access to the key is granted for instance only for a given period of time. More generally, according to a variable input (such as time) some operations are processed to re-compute a given key, instead of using a test. An example is digital audio or video content that is distributed via the Internet and rented by a user for, e.g., a month, and which is distributed in encrypted form. The user's decryption key should be valid only during that month. Existing methods test if the time is in the authorized range period, and if so then the access to the key is granted. A goal of the present method is to avoid this test so as to improve the security of the distribution system, by using the principle of derivative functions. The present method also has the advantage of avoiding a simple branch in the software (if, then, else, etc.) since branch protected software code may be too complex for certain applications.

In practice in accordance with the invention the key access is usually not done directly but embedded inside a more complex cryptographic process including an unpacking key process, and various conventional software code obfuscation techniques are also used.

Instead of protecting the key and securing the conditional access, a method is disclosed here such that according to a value tested, the locally generated (at the user device typically) key is correct, or is bad and thus unusable. (This can be used with both symmetric key cryptography and private key cryptography.) This disclosure illustrates this method with various solutions related to testing time as the value. The present methods and associated apparatus allow protecting access to cryptographic keys without making conditional tests. This provides flexibility with the possibility of managing the timing at any level of granularity. With some variants, the key does not need to be manipulated directly. Moreover, the key may be itself stored in an encrypted form and the decrypted key is computed "on the fly" locally at the user's device (dynamically), using available information.

The present approach can be combined with existing solutions to improve the overall security of a content distribution system such as a DRM (Digital Rights Management) system. Indeed, one can still for instance make the check (test) using classical obfuscation techniques and combine this with the present approach. Then an attacker would have to reverse engineer two levels of security and bypass both of them to break the overall DRM security.

DETAILED DESCRIPTION

Assume a cryptographic key has been generated to decrypt previously encrypted data such as audio or video content (the decryption being of internal or external content to a system), or the data being a result obtained previously in the same application or a previous one, or to digitally sign a document or data or to authenticate a message. Cryptographic keys are well known for all these applications. Also, suppose this key is such that it only is to be used during a given time period.

The prior method of protecting such a key involves checking if the current time is correct as regards key access, then unpacking the key if the time is correct and finally using the key. In accordance with the invention, this is replaced by a set of solutions that proceed on evaluation functions (and that also may be protected using conventional code obfuscation techniques) for generating the correct key only if the input variable value (such as a time period) is correct, or a "bad" key otherwise. The current variable value such as time thereby is used in a function that generates the key. Each call to this key generation function produces a result key, but the validity of this result key depends on the current variable value. If for example the current range of that variable such as a time period is that during which access to the key is authorized, the generated key is the correct one, otherwise a "bad" or "fake" key is generated which will not be useful.

The present method is applicable to variable values other then time, such as incoming data including a user identification number, or other data varying over time. In one embodiment the key generated from the variable function may be used as a pre-key which in turn is decrypted using a second key, where the pre-key is a function of time. To express this logically, pre-key=f (time), then Decrypt (pre-key, sensitive key)=real key.

Figure 1:
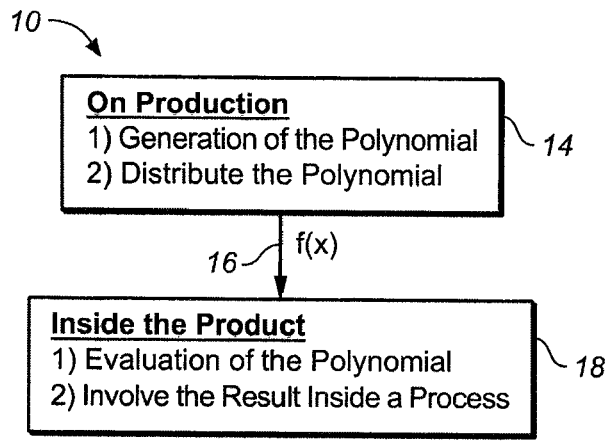
FIG. 1 shows the present method.

FIG. 1 depicts the present method 10 and its environment. Box 14 represents the key production function, e.g. at a server, which is distributing encrypted content via a DRM system, executing the steps of (1) generating a key generation polynomial (see below) and then (2) distributing the polynomial to the user platforms, where typically this distribution is via the Internet 16. Box 18 represents the subsequent activity at the user platform (device)/product, including (1) evaluating the polynomial at any time $t_i$ and (2) using the result in a cryptographic process, e.g. for key generation.

EXAMPLE 1

Suppose each day is coded as a value $d_i$. Value $d_i$ is, e.g., the day's date, a hash of the date, an encryption of the date, or a similar date-related value.

Let t+1 be the number of days for the key to be useful, typically t=29 (where the valid key time period is 30 days). Let 1 be the size (length in binary form) of the key K to be recomputed and used in another part of the cryptographic process. (Such keys are conventionally numbers expressed in binary form, and are typically very large numbers.) For instance, this can be a key K to decrypt a given file, or a key to authenticate a message or server or sign a document.

Define the polynomial f(x) as:

$$f(x)=A(x-do)(x-d_1)\ldots(x-d_t),$$

where A can be any value not equal to 0. A can also be a random number which is changed for each key K generation function evaluation.

The function f(x) (where x is e.g., the current date) equals 0 for any day $d_i$ and never 0 for any other day (before or after $d_i$), if the evaluation is done over integers. This is also the case, but with a high probability, if f(x) is evaluated modulo $2^l$. (The modulo evaluation is computationally faster and avoids too large a data manipulation.) The probability of a "false" 0 is smaller than $O(\frac{1}{2}^l)$ in the well known "Big O" notation.

K is the key value one needs to recompute or recover. Let function KK(x) be defined as follows:

$$KK(x)=(f(x)-1)\text{XOR } K \text{ XOR}(-1) \text{ evaluate mod } 2^l,$$

where XOR is the Boolean "exclusive OR" logic operation. Then KK(x) equals key K only when evaluated on the designated days of the period when the key is to be valid, meaning any $d_i$.

If a finer time granularity is needed, for instance checking the key validity by the hour in the specified day $d_i$, the same principle can be applied by using function g(x) instead of f(x) where:

$$g(x)=f(x)+B(x-d0)\ldots(x-d_{t-1})(x-d_t-1)(x-h_0)\ldots(x-h_h),$$

where h is a representation of the 24 hours of a day from 0 to h and B is a non zero value. The same principle can be extended to months, years, minutes, seconds, etc. for coarser or finer key granularity generation.

In one embodiment, polynomial f(x) is represented in a developed (expanded) form and evaluated in several steps using the update principle to confuse an attacker. Using the update principle, f(x) is computed as a loop: let f=1 be initially for i from zero to t. Update f=f(x−di); then the output is the updated f. One can further develop the function f. Suppose one wants to compute (x+a)·(x+b), which equals $x^2+(a+b)x+ab$. The same can be done on f or any part of f. Hence the function f is equal to zero or any fixed value when x is within a given range.

EXAMPLE 2

The advantage of developing function f is to harden the reverse of the function. This can also be combined with well known obfuscation techniques. In the previous example, key K is evaluated via a zero value of a given polynomial f(x) at chosen time values. This approach can be modified into the evaluation of any polynomial giving key K when evaluated at chosen times, and any other value at other times. An example is to use the function f(x)−K. It may be useful to use a polynomial of larger degree but taking on the value K at the chosen time. It is possible to have larger degrees of the polynomial by adding parts to the polynomial with only zeros over some extensions. For instance the polynomial $x^2+x+1$ has no root over Galois Field (2) but only over Galois Field (4). (See definition of a field below.) Then given the modulo over which the computation is performed, it is possible to add extra factors that have no zeros. The polynomial parts which are added must have a degree greater than 1. To generalize, one can use any function taking K when evaluated at the chosen times and any values at other times. In all the cases, this polynomial is generated dynamically, meaning at the time the validity of the time values for the key availability are to be decided.

EXAMPLE 3

Figure 2:
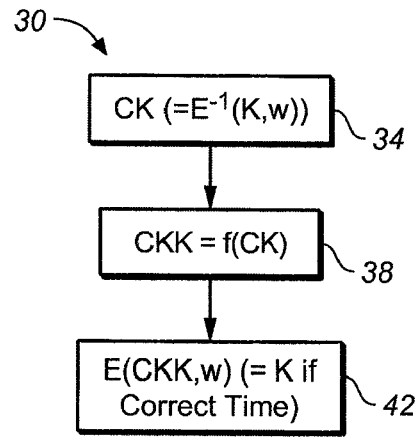
FIG. 2 shows detail of an example of the present method.

This example uses the same notation as above. With reference to method 30 of FIG. 2, at step 34 let CK be the value defined as the decrypted (similar for encrypted) value of key K with any encryption algorithm E under the key w for algorithm E, so:

$$CK=E^{-1}(K,w)$$

where $E^{-1}$ is the complementary decryption algorithm to an encryption algorithm E.

The value of CKK is computed at 38 as is KK in Examples 1 or 2 with CK. Key K is then obtained at step 42 by computing E(CKK,w), which is the encryption of CKK under the key w of E. The result equals K only within the specified do, ..., $d_t$, valid timing period.

The advantage of method 30 is that it removes any arithmetic relation between the key K and its evaluation. Recovering the correct (valid) key from a bad key requires an attacker to find second key w, which is very difficult. Moreover the encryption E/decryption $E^{-1}$ can be done within a "white-box" (highly secured encryption scheme) implementation of, e.g., a block cipher. Then the difficulty of recovering the key K would be related to the white-box security.

An alternative is to use a hash function instead of encryption, but then the key generation would be exposed to an attacker. An advantage in this case of an exposed key generation is that one bit error in CKK would produce a key with several false bits. Also, the encryption/decryption scheme E and $E^{-1}$ may be symmetric or asymmetric in terms of keys, according to the implementation choice.

EXAMPLE 4

Note that given two values x and y, there exists a function that outputs a third value A if x and y are equal and any value otherwise with a given probability, depending on the size of x, y, and A.

An example of a such function is:

h(x,y)=B(x−y+A/B) evaluated over a field, where B does not equal 0. (A field is an algebraic structure in which the arithmetic operations may be performed with the same rules as with ordinary arithmetic.)

If the function is evaluated over a ring (a field is a type of ring; in a ring, multiplication needs be commutative and there is an inverse), one only has to consider an invertible value for B. (Invertible here refers to the inverse of a given value in the ring.) A must not be equal to zero.

Suppose a reference value (reference state) is to be tested regularly at given times. Denote n as the reference state, and $n_t$ is each state computed at the given time t. Denote function Pt=h(n,no) ... h(n,$n_t$). (The Pt nomenclature is because this function has t+1 parts.) Then Pt is equal to 1 (if A=1) if and only if all the computed states are the same. This can also be simply extended to the case where two reference states (or more) are involved. If A is chosen as not equal to 1, instead of Pt, one may use the function Pt*$A^{-(t+1)}$ to correct the result, that is remove the extra A, or multiple extra A's if present where there is a different A for each h(n, $n_i$).

Function Pt can be computed with various different functions h, typically with variable invertible values A and B, then corrected by the product of the inverse of each A as indicated immediately above. Applied as in Example 1, the key K can be recovered as the inverse of function Pt, expressed as −Pt:

$$KK = -Pt \text{ XOR } K \text{ XOR}(-1)$$

which is equal to K if Pt is equal to 1.

This example can also be combined with that of Example 3, enhancing security since the key is only obtained after one decryption with the intermediate value CKK.

The second embodiment using CKK is advantageous since only one bit error on the input changes all bits of the generated key. Moreover, as indicated above, the key is thereby better protected. The key generated in accordance with the invention can be in various special forms, including having masking, and can be used for any cryptographic algorithm.

The present method has the advantage of allowing the comparison of various states to a reference state inside a global (overall) process.

The present method and apparatus may be embodied in a computer program (software) coded in any convenient computer language, such as C++, stored on a computer readable medium, to be executed on a computer or computing device having a processor programmed with such code or having equivalent logic circuitry, or a combination of such circuitry and software. Coding such a program or designing such circuitry would be routine in light of this disclosure.

Figure 3:
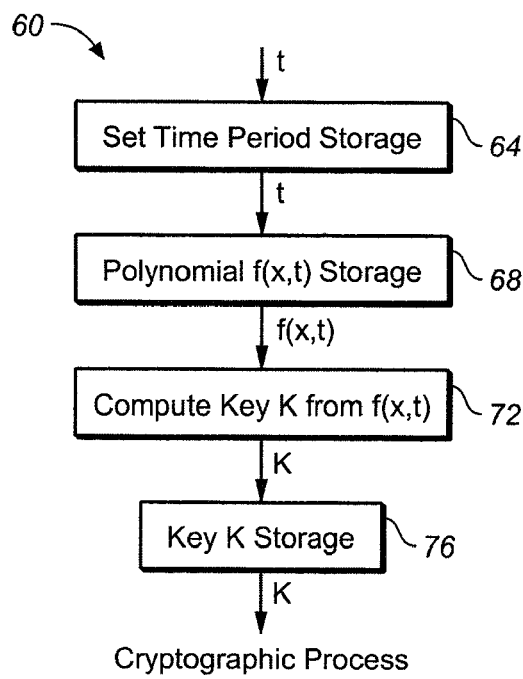
FIG. 3 shows an apparatus to carry out the present method.

FIG. 3 shows an apparatus 60 to carry out the present method, in block diagram form, and which may be embodied in a computing device such as a server, computer, or consumer electronics device. Apparatus 60 receives an indication of the current time t which is stored; this, for the "on production" activity 14 in FIG. 1 is the time t during which the key is to be used; for the "inside the product" activity 18 in FIG. 1 is the current time/date. (Use of time here as the input variable is only exemplary; as described above this is not limiting.) Next the polynomial f(x,t) stored at block 68 is provided to computational element 72 to compute key K. The key K is stored in storage element 76 (e.g., a register, like elements 64, 68) and then provided for use in the cryptographic process.

This disclosure is illustrative but not limiting; further modifications and embodiments will be apparent to those skilled in the art in light of this disclosure and are intended to fall within the scope of the appended claims.

The invention claimed is:

1. A computer enabled method to generate a key for a cryptographic process, from a variable input, the method comprising the acts of:
    providing a polynomial function of the variable input in a computing device having a processor, wherein the variable input relates to time, whereby the polynomial function is equal to zero only if the variable input is within a predetermined range;
    computing the key from the polynomial function executed by the processor of the computing device, wherein if the variable input is not within the predetermined range the computed key is bad,
    wherein the act of computing the key includes no conditional test of the key,
    wherein the key is computed from the polynomial function evaluated modulus $2^l$ by the processor of the computing device, l being a length of the key; and
    using the computed key in the cryptographic process.

2. The method of claim 1, wherein the cryptographic process is one of an encryption, a decryption, signing of a document, or authenticating a message.

3. The method of claim 1, wherein the variable input is one of a date, an encryption of a date, or a hash function value of a date.

4. The method of claim 1, wherein the variable input is a function of a date expressed as a year, month, day, an hour, or a second.

5. A non-transitory computer readable medium storing computer code for carrying out the method of claim 1.

6. The method of claim 5, wherein the computer code has been obfuscated.

7. The method of claim 1, wherein the predetermined range of the variable input is a time period of 30 days or one month.

8. The method of claim 1, further comprising evaluating the polynomial function in expanded form.

9. The method of claim 8, wherein the evaluating uses an update.

10. The method of claim 1, further comprising an act of encrypting the key.

11. The method of claim 10, further comprising an act of decrypting the key.

12. The method of claim 11, wherein the decryption is performed in a secure implementation.

13. The method of claim 1, wherein the method is performed at a server and further comprising an act of:
    distributing the polynomial function to a remote user device, wherein the cryptographic process is applied to content to be distributed to the user device.

14. The method of claim 1, wherein the method is performed at a user device which receives the polynomial function from a remote location.

15. An apparatus to generate a key for a cryptographic process, from a variable input, comprising:
    a first storage element adapted for storing the variable input, wherein the variable input relates to time;
    a second storage element, coupled to the first storage element, and adapted for storing a polynomial function of the variable input, whereby the polynomial function is equal to zero only if the variable input is within a predetermined range;
    a computational element coupled to the second storage element to compute the key from the polynomial function wherein if the variable input is not within the predetermined range, the computed key is bad,
    wherein the act of computing the key includes no conditional test of the key,
    wherein the key is computed from the polynomial function evaluated modulus $2^l$, l being a length of the key; and
    a third storage element coupled to the computational element and adapted for storing the key.

* * * * *